March 12, 1957  M. W. GUYER  2,784,655
ROD WEEDER

Filed Oct. 16, 1953  5 Sheets-Sheet 1

INVENTOR.
Morris W. Guyer
BY
Attis.

March 12, 1957 M. W. GUYER 2,784,655
ROD WEEDER
Filed Oct. 16, 1953 5 Sheets-Sheet 2
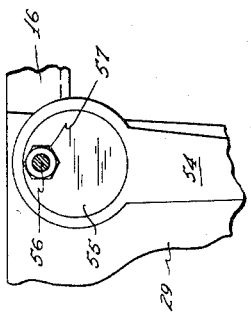
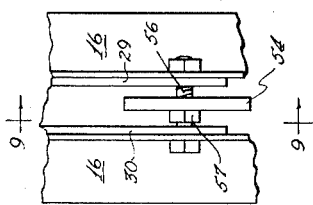
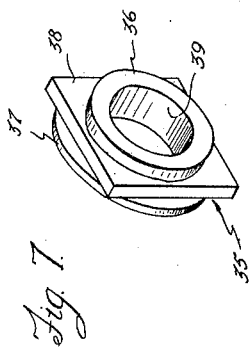
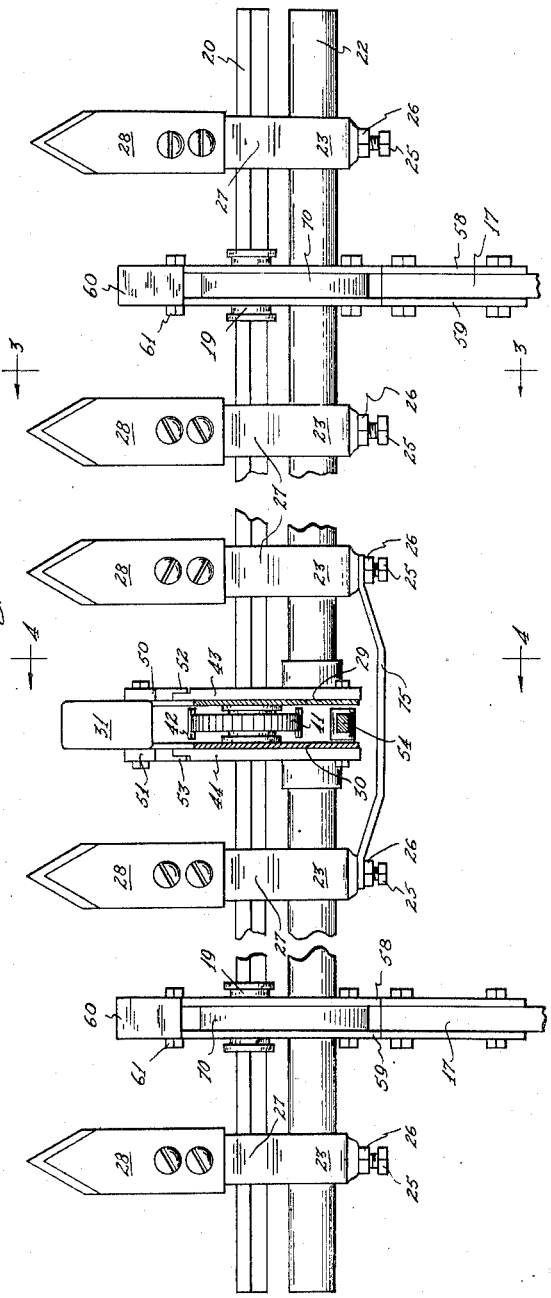
INVENTOR.
Morris W. Guyer
BY
Atty.

March 12, 1957

M. W. GUYER 2,784,655

ROD WEEDER

Filed Oct. 16, 1953

INVENTOR.
Morris W. Guyer
BY
*Frahlwells*
Atty.

March 12, 1957
M. W. GUYER
2,784,655
ROD WEEDER
Filed Oct. 16, 1953
5 Sheets-Sheet 4
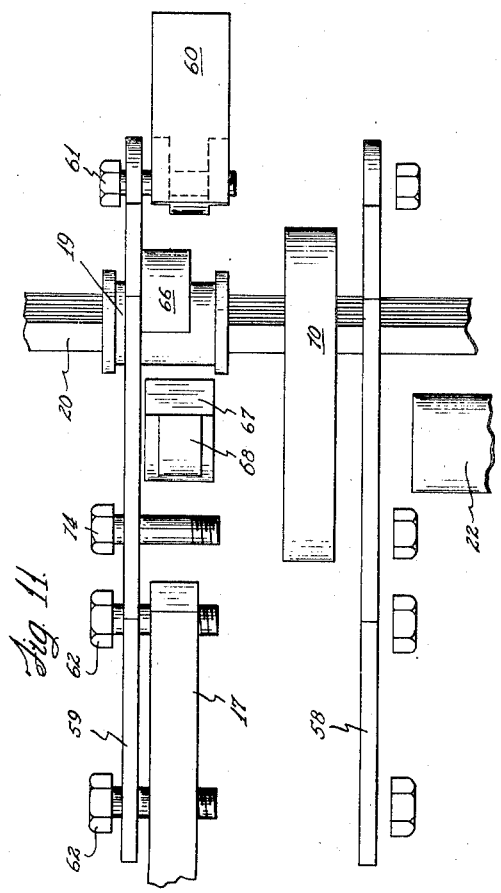
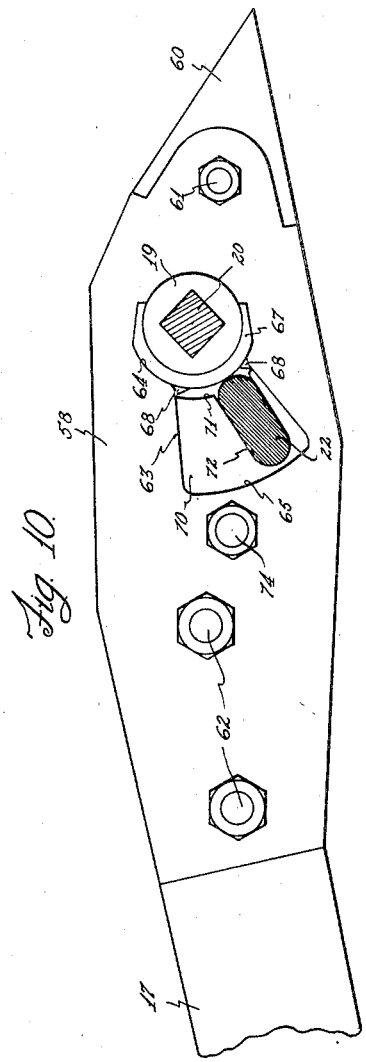
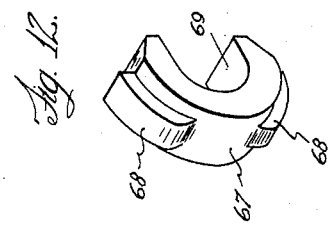
INVENTOR.
Morris W. Guyer
BY
Atty.

March 12, 1957 M. W. GUYER 2,784,655
ROD WEEDER

Filed Oct. 16, 1953 5 Sheets-Sheet 5

INVENTOR.
Morris W. Guyer
BY
Atty.

United States Patent Office 2,784,655
Patented Mar. 12, 1957

2,784,655
ROD WEEDER
Morris W. Guyer, Spokane, Wash., assignor to Calkins Manufacturing Company, Spokane, Wash.
Application October 16, 1953, Serial No. 386,463
14 Claims. (Cl. 97—42)

My invention relates to improvements in a rod weeder.

In tillage implements used for weeding and tilling the soil while leaving the uprooted weeds on the surface of the ground to dry, devices are used comprising a rotary rod and a series of closely spaced plow shovels or points directed to loosen the soil in front of the rod. Such a device is described in Patent No. 2,353,485 to O. E. Miller.

The problem in these devices is to mount the shovels or points so that their angular position in the ground may be adjusted without changing the position, or hindering the action of the rotary rod. In implements employing center drive mechanisms for the rotary rod, the problem is increased since the shovel mountings must be adjustably secured to the drive mechanism, without hindering its function.

It is the purpose of my invention to provide a series of shovels or points which will cultivate the ground in front of the rotary rod without hindering its function, and which are so mounted on the machine that their angular position with respect to the ground may be easily and quickly changed while the machine is in the field.

A further purpose of my invention is to provide a mounting for the shovels which may be attached and removed from the implement with a minimum of time and effort, so that the implement may be used as a rod weeder alone if desired.

My invention employs a transverse bar which is adjustably mounted to the gooseneck standards and the center drive mechanism of the machine behind the rotary rod. Shovel mounting arms are secured at spaced intervals to the bar and extend forwardly over the rotary rod, each arm having a cultivating shovel secured to its forward end. The principal purpose of the invention is to provide novel means by which the shovel carrying bar is adjustably secured to the rod supporting and driving mechanism and the gooseneck standards.

The transverse bar is broken at the center drive mechanism, one section extending from each side of the center drive to one side of the implement. Each of the two sections is supported at one end by a rotatable plate on the center drive mechanism, the plates being so formed that they rotate about the axis of the rotary rod. The bars are rotatably supported along their length by supporting shoes attached to the gooseneck standards of the implement.

The nature and advantages of my invention will appear more fully in the following description and accompanying drawings in which a preferred form of the invention is shown. The description and drawings are illustrative only, however, and are not intended to limit the invention except insofar as it is limited by the claims.

In the drawings:

Figure 2 is an enlarged plan view of my invention looking in the direction of the arrows 2—2 on Figure 1;

Figure 7 is a perspective view of the novel sprocket bearing employed in my invention;

Figure 8 is a fragmentary plan view of the top of the center drive illustrating the means by which the transverse bars are adjusted;

Figure 9 is a fragmentary sectional view taken on the line 9—9 of Figure 8.

Figure 10 is a side elevation view of the rod and bar supporting shoe which is provided at the lower end of each gooseneck standard;

Figure 11 is an exploded plan view of the shoe showing the method used to assemble the shoe;

Figure 12 is a perspective view illustrating one of the bearing sections within the shoe;

Figure 1:
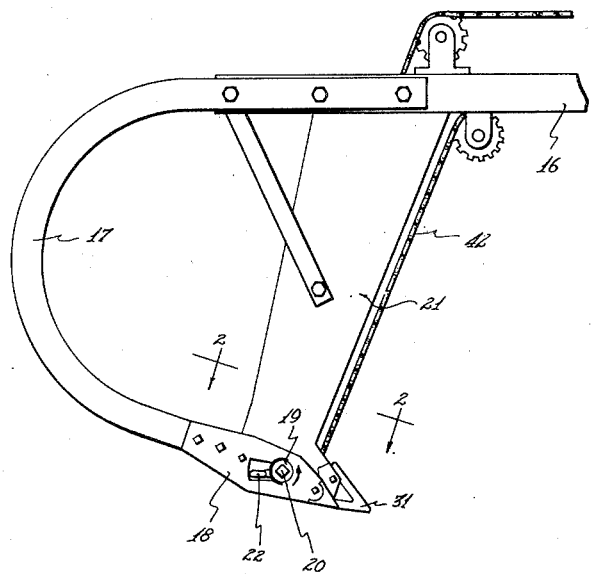
Figure 1 is a partial side elevation view of a tillage implement embodying my invention.
Figure 3:
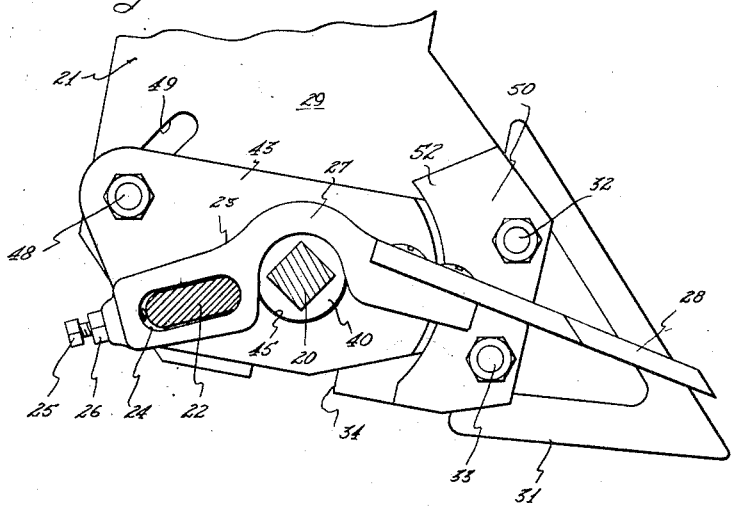
Figure 3 is an enlarged sectional view taken on the line 3—3 of Figure 2.

Referring now to the drawings and to Figures 1, 2, and 3 in particular, my invention is shown as employed with machine such as that partially shown in Figure 1. This machine, known as a Rod Weeder, is a soil tillage implement. It is composed of a main frame 16, carried on wheels (not shown) and drawn over the ground by a powered vehicle (not shown). At the rear of the main frame 16, a plurality of rod supporting standards 17, commonly known as goosenecks, are mounted. Each standard 17 carries at its lower end, a shoe 18 which will be fully described later herein. The shoes 18 rotatably support bearing spools 19, which in turn support a rotary rod 20. The rod 20 is adapted to rotate in the soil in the direction indicated, as the machine is drawn through the fields.

The rod 20 is driven from its center by means of a drive mechanism 21, similar to that shown and described in Patent No. 2,506,577 issued to Claude C. Calkins.

On either side of the center drive mechanism 21, transverse bars 22 are mounted. The bars 22 are positioned behind the rotary rod 20, and are supported along their length by the shoes 18 on the gooseneck standards 17. Shovel mounting arms 23 are fastened on the bars 22 at spaced intervals. These arms 23 are mounted by sliding the bar 22 through the slots 24 formed in the arms 23. When the arm 23 is in the desired position along the bar 22, it is secured by a set screw 25 and locked in position by a lock nut 26. The arm 23 has bowed up portion 27 positioned in front of the slot 24, to allow the rod 20 to pass under. At the front of each arm 23, a shovel 28 is attached.

Figure 4:
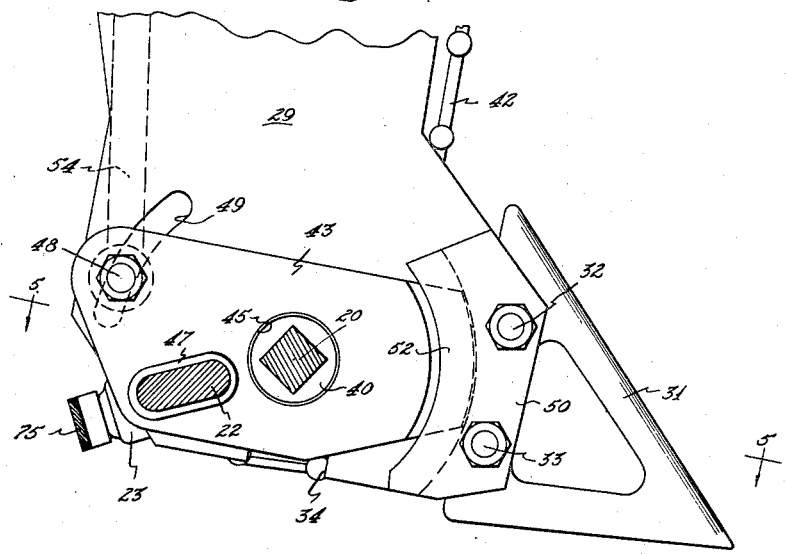
Figure 4 is an enlarged sectional view taken on the line 4—4 of Figure 2.
Figure 5:
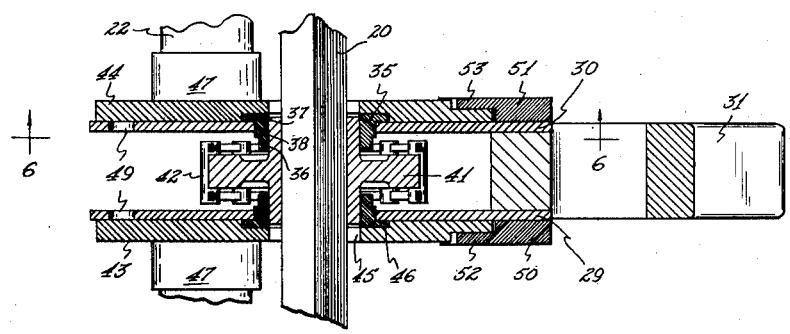
Figure 5 is a sectional view taken on the line 5—5 of Figure 4.
Figure 6:
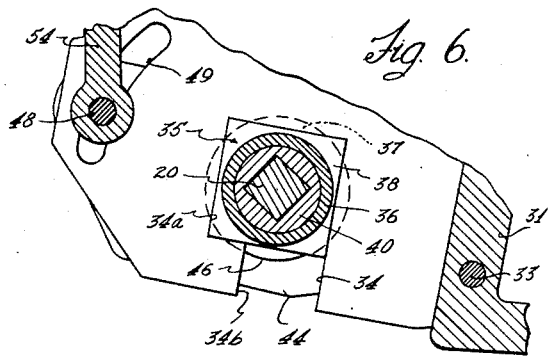
Figure 6 is a sectional view taken on the line 6—6 of Figure 5.

The central drive mechanism 21 for the rotary rod 20 (see Figures 4, 5, and 6) is supported by two downwardly depending standards 29 and 30. The standards 29 and 30 are fastened to the main frame 16 at their upper ends and slant toward the rear of the machine as they extend downward. The standards 29 and 30 are spaced apart at their lower ends by a nose piece 31 which is secured between the standards 29 and 30 by bolts 32 and 33. The nose piece 31 serves to break the earth in front of the drive mechanism and provides a pathway for the mechanism to follow.

The standards 29 and 30 have L-shaped slots 34 extending upwardly from their lower faces which are adapted to receive bearing members 35. The slots 34 are formed of a square portion 34a which actually receives the bearing 35 and a smaller portion 34b which extends from the lower face of the standard 29 or 30 to the square portion 34a. Each bearing member 35 is formed of three portions (best shown in Figure 7), a small cylindrical portion 36 at one face, a substantially larger concentric cylindrical portion 37 at the opposite face, and between these portions 36 and 37 a squared portion 38. The length of the sides of the square portion 38 is less than the diameter of the portion 37 but the diagonal distance across the portion 38 is longer than the diameter of the portion 37. The intermediate square portion 38 of the bearing 35 fits into the square portion 34a of the slot 34 in the standard 29 or 30, there being, of course, a slot 34 and a bearing 35 for each of the two standards 29 and 30. The bearings 35 each have an inner bearing surface 39 which receives a hub portion 40 of the drive 41 which transmits the rotary motion to the rod 20. The sprocket 41 is supported between the bearings 35 which, in turn, are supported by the squared portions 34a of the slots 34. The sprocket 41 is driven by a chain 42 which may receive power from any suitable source.

In a drive mechanism of this type, the rotating parts are all rough cast, and the bearings loose, since the mechanism operates in the soil. Because of the abrasive action of the dirt, the bearings wear out rapidly and must be replaced often. The wear on the bearing is concentrated at the rear side of the inner surface, due to pressure of the on the rotating rod. Hence, the usual bearings used in these mechanisms must be discarded when there is still a substantial portion of the inner surface which has not been appreciably damaged.

When the bearings 35 have been in use long enough to have their rear portions badly worn, they may be taken out of the slot 34, turned a quarter of a turn and re-inserted, thus presenting a substantially new surface for wear. This characteristic makes the bearings suitable for use for a length of time several times the life of a normal weeder drive bearing.

In order to secure the bearings 35 in the slots 34, and also to provide mounting means for the shovel carrying bars 22, plates 43 and 44 are provided. The plates 43 and 44 are identical except one is a left hand member while the other is a right hand member. It is believed that a description of one will suffice for both.

The plate 43 is of a thickness substantially equal to twice that of the large circular portions 37 on the outside faces of the bearings 35. The plate 43 has a central aperture 45 through which the rod 20 may pass. On the inside face of the plate 43, a circular depression 46, concentric with the aperture 45, is formed. The depression 46 is adapted to receive the outer circular portion 37 of the bearing 35. When the plate 43 is fastened against the standard 29, the bearing 35 is secured in place. On the face of the plate 43 opposite the face in which the depression 46 is formed, a sleeve 47 is secured, this sleeve 47 being shaped to receive and support one end of the bar 22.

The plates 43 and 44 are fastened to the standards 29 and 30 for limited rotation about the rod 20. In order to fasten the rear ends of the plates 29 and 30, a bolt 48 is run through the plates 43 and 44 and the standards 29 and 30. Curved slots 49 are formed in the standards 29 and 30 for the bolt 48 to pass through and to allow the plates 43 and 44 to be rotated about the rod 20. The front ends of the plates 43 and 44 are secured to the standards 29 and 30 for limited rotation by guide members 50 and 51 which are secured to the standards 29 and 30 respectively by the bolts 32 and 33 which secure the nose piece 31. The guide members 50 and 51 have rearwardly extending portions 52 and 53 which are spaced outwardly from the standards 29 and 30. The front edges of the plates 43 and 44 extend between these portions 52 and 53 and the standards 29 and 30 are held against moving outwardly, while free to rotate about the rod 20. In order to provide an easy means to rotate the plates 43 and 44 about the rod 20, I provide an arm 54 which is connected at its lower end to the bolt 48, and has its upper end connected to an eccentric portion 55 of a shaft 56 (see Figures 8 and 9). The shaft 56 is supported by the frame 16 of the machine. A nut 57 welded or otherwise secured to the shaft 56 and the eccentric 55, provides a means to turn the shaft and eccentric, which lifts or lowers the arm 54. This lifts or lowers the bolt 48, which in turn rotates the plates 43 and 44. The large circular portions 37 of the bearings 35 provide a pivot for this rotation. Since the centers of these bearings coincide with the axis of the rotary rod 20, the spacing of the bar 22 and also the shovels 28, with respect to the rod 20, is not changed. The bar 22 and the shovels 28, in fact, rotate about the rotary rod 20.

In order to provide an adjustable support for the transverse bar 22 along its length, I provide the standards 17 and shoes 18 with a novel bar supporting construction. This construction provides a bearing for the rod 20, angular adjustment of the bar 22 about the rod 20, and easy removal of the bar 22. Figures 10 to 15 illustrate this construction.

The shoes 18 are formed of two main side pieces 58 and 59. The side pieces 58 and 59 are spaced apart at the front by a pointed nose 60 secured between them by a bolt 61. The rear ends of the pieces 58 and 59 are bolted on either side of the lower edge of the gooseneck standard 17 by bolts 62. Each of the side pieces 58 and 59 has an aperture 63 therein, shaped somewhat like a key hole. The front portion 64 of the slot 63 is roughly circular in shape, except that the rear half of the circle is somewhat larger in diameter than the front half. The front portion of the aperture 63 allows the bearing spool 19 and the rod 20 to pass through the shoe 18. The rear portion 65 of the slot 63 allows the bar 22 to pass through the shoe 18, and permits limited angular adjustment of the bar 22 about the rod 20.

Figure 13:
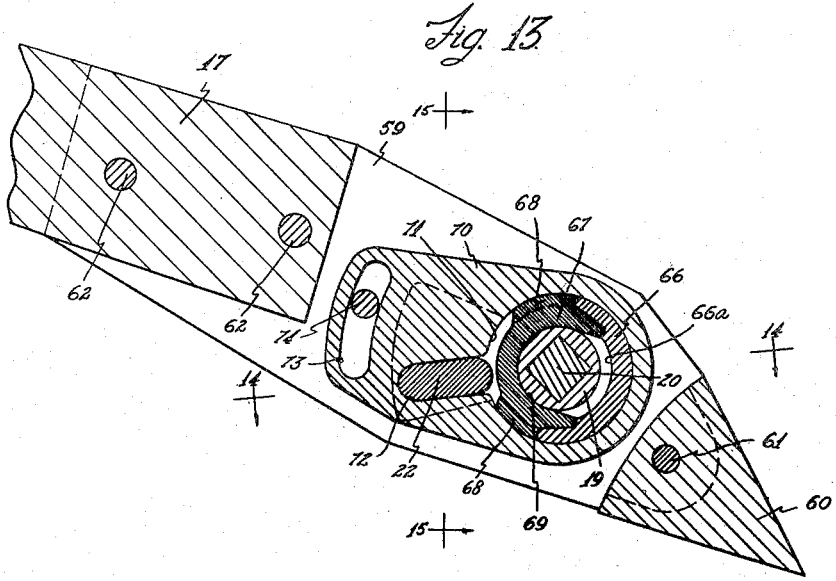
Figure 13 is a sectional view showing the interior of the shoe.
Figure 14:
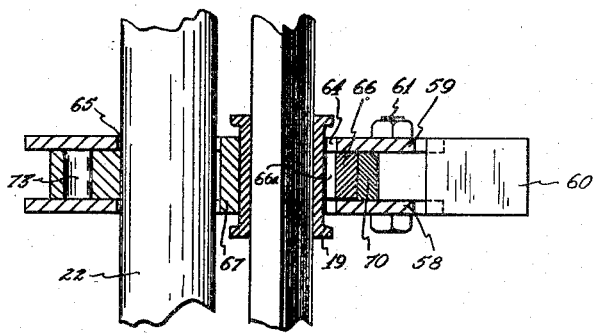
Figure 14 is a sectional view taken on the line 14—14 of Figure 13.
Figure 15:
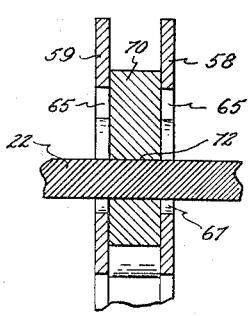
Figure 15 is a sectional view taken on the line 15—15 of Figure 13.

Welded to the inside face of the side piece 59 is a semicircular bearing member 66. The member 66 is so formed that its inner face extends around the forward half of the circular portion 64 of the aperture 63. A separate semicircular bearing member 67 fits against the member 66 to form a complete bearing. The member 67 (best shown in Figure 12) is the same diameter as the rear section of the circular portions 64 of the apertures 63, so that it fits into the apertures 63, and its ends are supported in the side pieces 58 and 59. Lugs 68 are formed on the outer surface of the member 67, which hold it between the side pieces 58 and 59. The member 67 also has an inner bearing surface 69, smaller in diameter than the inner surface 66a of the member 66. The outside diameter of the lugs 68 is the same as the outside diameter of the bearing member 66, so that when the members are fitted together as shown in Figure 13, their outside surfaces present a cylindrical face.

A bar supporting plate 70 is positioned between the side pieces 58 and 59. The plate 70 has an aperture 71 therein to receive the members 66 and 67. A slot 72 extends radially from the aperture 71, and is adapted to receive the bar 22. The plate 70 also has near its rear edge a curved slot 73, which allows a bolt 74 to pass through the plate. The bolt 74 and the slot 73 serve to limit the rotation of the plate 70 about the bearings 66 and 67. The plate 70 is of a thickness slightly wider than the member 66 and the lugs 68 on the member 67, so that when the bolt 74 is drawn tight, the plate 70 is clamped between the side pieces 58 and 59, and held stationary to maintain the angular position of the bar 22.

With the construction just described, it is possible to obtain greater bearing life than in the normal bearing shoe. The plate 70, carrying the bar 22 is forced rearward by the soil pressure on the bar. This pressure is transmitted by the plate 70 to the bearing 66, which as mentioned is welded to the side pieces 58 and 59. Thus the pressure due to the bar 22 is transmitted directly to the side pieces 58 and 59 and does not affect the rod bearing. The bearing 67 takes the pressure from the rod 20 and transmits it through the rear edges of the portion 64 of the aperture 63, to the side pieces 58 and 59. The wear from the bearing spool 19 does not, therefore, affect the front bearing 66. Since the rod 20 and spool 19 are continuously rotating and the plate 70 only seldom is pivoted, it is obvious that the bearing 67 will wear out much sooner than the other components of the shoe 18. Since the bearing 67 is a separate member, it can be replaced when necessary without discarding the complete unit.

The assembly of the shoe 18 about the rod 20 and the bearing spool 19 is as follows. It is necessary that the bearing spool 19 extends through the shoe 18, but it is also necessary that the spool isn't allowed to slip along the rod out of the shoe. With my construction, when the shoe is assembled, the spool 19 is rotatably held in the shoe 18 but cannot slip sidewise.

Figure 11 illustrates the manner in which the shoe is assembled. The side piece 59 and its attached bearing member 66 are slipped over the rod 20 and along it to the gooseneck standard 17 to which they will be attached. The bolts 62 are then run through the piece 59 and the standard 17 to hold the piece 59 in place. Next the spool 19 is slid along the rod 20 and one end slipped through the aperture 63 in the side piece 59, as may be seen from Figure 10. The largest diameter of the spool 19 is just equal to the small half of the front portion 64 of the aperture 63. After this has been accomplished, the separate bearing member 67 is fitted into place against the member 66. This member 67 partially fills the aperture 63 so that the spool 19 can no longer be pulled out. The plate 70 is slipped over the members 66 and 67 then, to hold the member 67 in place. The bolt 74 may then be run through the slot 73 in the plate 70. The pointed nose member 60 is then fitted against the piece 59 and the bolt 61 slipped through it. All that remains to be done after this, is to slip the side piece 58 over the rod and into place. The aperture 63 in this piece 58 passes over the spool 19, and then is fitted around the member 67 so that the spool is secured against sidewise motion in either direction. The bolts 61 and the bolts 62 are then tightened and the assembly is complete.

When the transverse bar and shovel assembly is to be used, the bar is slipped through the rear portions 65 of the apertures 63 in the side pieces 58 and 59, and through the slot 72 in the plate 70. The mounting arms 23 and shovels 28 may then be slipped on the bar 22 before it is secured in the sleeve 47 on the plate 43 or 44. When the bars 22 are in place on both sides of the center drive mechanism 21, a tie strap 75 is secured to the closest mounting arm 23 on either side of the drive mechanism 21, to keep the bars 22 in place.

The removal of the bar and shovel assembly is just as easy. The tie strap 75 is removed, the mounting arms loosened, and then the bar 22 may be pulled through the shoe 18, shedding the shovels as it goes.

If when operating the device, the operator desires to change the angle of the shovels, he merely stops the machine, goes back and loosens the bolts 74 on the shoes 18, and adjusts the angle of the bar 22 and shoes 18 by use of the eccentric 55 and nuts 57 on the shaft 56. Then he tightens the bolts 74 again and the operation is completed.

It is believed that the nature and advantages of my invention appear fully from the foregoing description and accompanying drawings.

Having thus described my invention, I claim:

1. In a tillage implement, a soil cultivating device comprising a rotary transverse rod, a drive mechanism for said rod, spaced apart standards for supporting the rod, a series of tillage points spaced in front of the rod, a transverse bar spaced behind the rod and carrying the tillage points, bearing shoes on the spaced apart standards, said bearing shoes rotatably supporting the rod, and said bearing shoes also having means supporting the bar behind the rod for limited rotation about the rod.

2. In a tillage implement, a soil cultivating device comprising a rotary transverse rod, a drive mechanism for said rod, spaced apart standards for supporting the rod, a series of tillage points, a transverse bar carrying the tillage points, mounting plates for securing the transverse bar to the drive mechanism, said drive mechanism comprising two depending standards, a nose piece mounted at the lower forward edges of said standards, a chain driven sprocket between the standards, said sprocket being mounted on the transverse rotary rod, slots formed at the lower edges of the depending standards and having squared bearing receiving portions therein, bearing members in the slots supporting the sprocket between the depending standards, said bearing members each having a squared portion intermediate its end faces to fit in the squared portions of the slots and having a circular portion adjacent its outer face, said mounting plates each having a central aperture for the transverse rotary rod to pass through and having a larger circular depression, concentric with the central aperture to receive the large circular portion of the bearing, said mounting plates being connected one to the other at their rear ends by a bolt, said bolt passing through curved slots in the depending standards, said plates being rotatably secured at their front ends against the depending standards by overlapping guide plates, mounting sockets on the mounting plates to receive adjacent ends of the transverse bars, said mounting sockets being positioned rearwardly from the central aperture, bearing shoes on the spaced apart standards, said bearing shoes rotatably supporting the rotary rod, and said shoes also having means supporting the transverse bar behind the rotary rod for limited rotation about the rotary rod.

3. In a tillage implement, a soil cultivating device comprising a rotary transverse rod, a drive mechanism for said rod, spaced apart standards for supporting the rod, a series of tillage points, a transverse bar carrying the tillage points, means mounting the bar on the drive mechanism behind the rod for limited rotation about the rod, bearing shoes on the spaced apart standards, said bearing shoes comprising two side pieces, a pointed nose piece secured between the side pieces at the front thereof, apertures in the side pieces, said apertures having a front circular portion to allow the rotary rod to pass through and having a rear portion to allow the transverse bar to pass through and to permit limited angular adjustment of the bar, a semicircular bearing member attached to one side piece in front of the aperture and extending circumferentially half way around the aperture, a separate semicircular bearing member fitted behind said bearing member and extending around the opposite half of the front portion aperture, a bearing spool mounted on the rotary rod and extending through the side pieces between said two semicircular bearing members, a bar supporting plate positioned between the side pieces, said bar supporting plate having an aperture to receive said two semicircular bearing members and having a slot behind said aperture to receive the transverse bar, a curved slot in said bar supporting plate, a bolt extending between the side pieces and through said curved slot, said bolt and slot cooperating to permit angular adjustment of the bar supporting plate about the semicircular bearing members.

4. In a tillage implement of the character described, a standard having two spaced apart wall portions, a sprocket between said portions having a hub provided with a square central aperture, a square weeding rod extending through the aperture, the wall portions having slots therein, said slots having squared bearing receiving portions, bearing members rotatably receiving the ends of the sprocket hub, the rod extending through the bearing members, the bearing members having square portions intermedite their ends slidably fitting in the squared portions of the slots, mounting plates secured to the outer faces of said wall portions and having bearing sockets, the plates being angularly adjustable on the wall portions about the sockets as a center, the bearing members having cylindrical portions outwardly of the square portions and journalled in said bearing sockets, the cylindrical portion of each bearing member being smaller in diameter than the diagonal distance across the square portion.

5. In a tillage implement of the character described, a standard having two spaced apart wall portions, a sprocket between said portions having a hub provided with a square central aperture, a square weeding rod extending through the aperture, the wall portions having slots therein, said slots having squared bearing receiving portions, bearing members rotatably receiving the ends of the sprocket hub, the rod extending through the bearing members, the bearing members having square portions intermediate their ends slidably fitting in the squared portions of the slots, mounting plates secured to the outer faces of said wall portions and having bearing sockets, the plates being angularly adjustable on the wall portions about the sockets as a center, the bearing members having cylindrical portions outwardly of the square portions and journalled in said bearing sockets, the bearing sockets comprising recesses in the wall portion engaging faces of said plates, the plates having apertures from the centers of said recesses to pass the rod.

6. In a tillage implement of the character described, a standard having two spaced apart wall portions, a sprocket between said portions, said sprocket having a hub provided with a square central aperture, a square weeding rod extending through said aperture, the wall portions having slots therein, said slots having squared bearing receiving portions, bearing members rotatably receiving the ends of the sprocket hub, the rod extending through the bearing members, the bearing members having square portions intermediate their ends slidably fitting in the squared portions of the slots, mounting plates secured to the wall portions on their outside faces and having bearing sockets therein, the bearing members having cylindrical portions spaced outwardly of the squared portions, said cylindrical portions being journalled in the bearing sockets, the mounting plates being adjustable for limited rotation about the bearing sockets as a center, transverse bars extending outwardly from the sides of the wall portions and spaced rearwardly from the square rod, arms mounted on the transverse bars and extending forwardly over the square rod, shovels mounted on the forward ends of the arms in front of the rod and means on the mounting plates securing adjacent ends of the transverse bars to the mounting plates, said means being spaced rearwardly from the bearing sockets.

7. In a tillage implement of the character described, a standard having two spaced apart wall portions, a sprocket between said portions, said sprocket having a hub provided with a square central aperture, a square weeding rod extending through said aperture, the wall portions having slots therein, said slots having squared bearing receiving portions, bearing members rotatably receiving the ends of the sprocket hub, the rod extending through the bearing members, the bearing members having square portions intermediate their ends slidably fitting the squared portions of the slots, mounting plates secured to the wall portions on their outside faces and having bearing sockets therein, the bearing members having cylindrical portions spaced outwardly of the squared portions, said cylindrical portions being journalled in the bearing sockets, the bearing sockets comprising recesses in the wall portion engaging faces of the mounting plates, said plates having apertures at the centers of the sockets to pass to rod, the mounting plates being adjustable for limited rotation about the bearing sockets as a center, transverse bars extending outwardly from the sides of the wall portions and spaced rearwardly from the square rod, arms mounted on the transverse bars and extending forwardly over the square rod, shovels mounted on the forward ends of the arms in front of the rod and means on the mounting plates securing adjacent ends of the transverse bars to the mounting plates, said means being spaced rearwardly from the bearing sockets.

8. In a tillage implement, a soil cultivating device comprising a transverse rotary rod, a drive mechanism for said rod, a series of plow shovels, a transverse bar carrying the plow shovels, mounting plates for securing the transverse bar to the drive mechanism, said mounting plates being secured to the drive mechanism for limited rotation about the axis of the transverse rotary rod, said mounting plates rotatably supporting bearing members, said bearings mounting between them a sprocket for rotating the transverse rotary rod, said bearing members having squared portions intermediate their outside faces, supports depending from the implement, said supports having rectangular slots at their lower ends to receive said squared portions of the bearing members, rod supporting standards spaced from the supports, and means for supporting the opposite ends of said transverse bar to the rod supporting standards depending from the implement, said means being adjustable for limited rotation about the axis of the rod.

9. In a tillage implement, a soil cultivating device comprising a transverse rotary rod, a drive mechanism for said rod, a series of tillage points, a transverse bar carrying said tillage points spaced apart standards for supporting the rod, bearing shoes attached to the lower ends of said standards, said bearing shoes having spaced apart side portions, rod supporting bearing members retained by and between said side portions, a bar supporting plate pivoted on said bearings, a slot in said plate behind the pivot point to receive the transverse bar, and means to adjust the angular position of the bar supporting plate about the bearings.

10. In a tillage implement of the character described, a standard having two spaced apart wall portions, a sprocket between said portions, said sprocket having a hub provided with a square central aperture, a square weeding rod extending through said aperture, the wall portions having slots therein, said slots having squared bearing receiving portions, bearing members rotatably receiving the ends of the sprocket hub, the rod extending through the bearing members, the bearing members having square portions intermediate their ends slidably fitting in the squared portions of the slots, mounting plates secured to the wall portions on their outside faces and having bearing sockets therein, the bearing members having cylindrical portions spaced outwardly of the squared portions, said cylindrical portions being journalled in the bearing sockets, the mounting plates being adjustable for limited rotation about the bearing sockets as a center, transverse bars extending outwardly from the sides of the wall portions and spaced rearwardly from the square rod, arms mounted on the transverse bars and extending forwardly over the square rod, shovels mounted on the forward ends of the arms in front of the rod and means on the mounting plates securing adjacent ends of the transverse bars to the mounting plates, said means being spaced rearwardly from the bearing sockets, spaced apart rod supporting standards depending from the implement frame, bearing shoes attached to the lower ends of said standards, said bearing shoes having spaced apart side portions, rod supporting bearing members positioned between said side portions, a bar supporting plate pivoted on said bearing members, a slot in said plate spaced behind said pivot point to receive and support the transverse bar, and means to adjust the angular position of the bar supporting plate about the bearing members.

11. In a tillage implement of the character described, a standard having two spaced apart wall portions, a sprocket between said portions, said sprocket having a hub provided with a square central aperture, a square weeding rod extending through said aperture, the wall portions having slots therein, said slots having squared bearing receiving portions, bearing members rotatably receiving the ends of the sprocket hub, the rod extending through the bearing members, the bearing members having square portions intermediate their ends slidably fitting the squared portions of the slots, mounting plates secured to the wall portions on their outside faces and having bearing sockets therein, the bearing members having cylindrical portions spaced outwardly of the squared portions, said cylindrical portions being journalled in the bearing sockets, the bearing sockets comprising recesses in the wall portion engaging faces of the mounting plates, said plates having apertures at the centers of the sockets to pass the rod, the mounting plates being adjustable for limited rotation about the bearing sockets as a center, transverse bars extending outwardly from the sides of the wall portions and spaced rearwardly from the square rod, arms mounted on the transverse bars and extending forwardly over the square rod, shovels mounted on the forward ends of the arms in front of the rod and means on the mounting plates securing adjacent ends of the transverse bars to the mounting plates, said means being spaced rearwardly from the bearing sockets, spaced apart rod supporting standards depending from the implement frame, bearing shoes attached to the lower ends of said standards, said bearing shoes having spaced apart side portions, rod supporting bearing members positioned between said side portions, a bar supporting plate pivoted on said bearing members, a slot in said plate spaced behind said pivot point to receive and support the transverse bar, and means to adjust the angular position of the bar supporting plate about the bearing members.

12. In a tillage implement, the combination with a supporting standard, of a transverse rotary rod, an inner bearing member slidably and non-rotatably receiving the rod, a tillage point carrying bar, and means mounting the inner bearing member for rotation on said standard and supporting said bar for limited angular movement about the rod as an axis, said means comprising an intermediate bearing member non-rotatably seated in the supporting standard, said intermediate bearing member having an inner bearing surface receiving the inner bearing member on the rod and having an outer bearing surface, a bar supporting plate having a socket therein, said socket rotatably receiving the outer bearing surface of the intermediate bearing member, said bar supporting plate being rotatably secured against the standard for limited angular movement about the intermediate bearing member.

13. In a tillage implement, the combination with a supporting standard, of a transverse rotary rod, an inner bearing member non-rotatably mounted on the rod, an outer bearing portion on the member, a tillage point carrying bar, and means mounting the inner bearing member for rotation on said standard and supporting the bar for limited angular movement about the rod as an axis, said means comprising an intermediate bearing member having a squared portion intermediate its end faces and having a circular portion adjacent its outer face, the supporting standard having a squared aperture receiving the squared portion of the intermediate bearing member, said intermediate bearing member having an inner bearing surface receiving the said outer bearing portion, a bar supporting plate having a socket therein, said socket rotatably receiving the circular portion of the intermediate bearing member, said bar supporting plate being rotatably secured against the supporting standard for limited angular movement about the intermediate bearing member, and means on the plate mounting the adjacent end of the tillage point carrying bar, said last named means being positioned behind the socket.

14. In a tillage implement, the combination with a supporting standard, of a transverse rotary rod, a bearing spool non-rotatably mounted on the rod, a tillage point carrying bar, and means mounting the bearing spool for rotation on said standard and supporting said bar for limited angular movement about the rod as an axis, said means comprising an intermediate bearing, said bearing being composed of two semicircular sections, the front section being secured to the supporting standard, and the rear section being separate and having shoulder portions, apertures in the standard to receive said shoulder portions and holding said separate bearing section against rearward movement, said front and rear sections of said intermediate bearing member having inner bearing surfaces receiving the bearing spool, a bar supporting plate having a socket therein, said socket rotatably receiving said intermediate bearing member, said bar supporting plate having a slot therein positioned behind the socket, said slot receiving the tillage point carrying bar, and said bar supporting plate being secured to the standard for limited angular movement about the intermediate bearing member.

References Cited in the file of this patent

UNITED STATES PATENTS

| | | |
|---|---|---|
| 2,282,560 | Calkins et al. | May 12, 1942 |
| 2,299,522 | Calkins et al. | Oct. 20, 1942 |
| 2,355,950 | Calkins et al. | Aug. 15, 1944 |
| 2,441,244 | Kimball | May 11, 1948 |